(12) United States Patent
Bogenstätter et al.

(10) Patent No.: US 8,790,611 B2
(45) Date of Patent: Jul. 29, 2014

(54) REACTOR FOR CARRYING OUT AN EXOTHERMIC REACTION IN THE GAS PHASE

(71) Applicant: BASF SE, Ludwigshafen (DE)

(72) Inventors: Thomas Bogenstätter, Bad Dürkheim (DE); Heribert Deck, Rheinstetten (DE); Ortwin Gröhl, Neustadt (DE); Thomas Weeser, Bingen (DE); Jan Ulrich, Schoten (BE); Jasmina Kessel, Mannheim (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/935,807

(22) Filed: Jul. 5, 2013

(65) Prior Publication Data

US 2014/0010751 A1     Jan. 9, 2014

Related U.S. Application Data

(60) Provisional application No. 61/668,043, filed on Jul. 5, 2012.

(51) Int. Cl.
| | |
|---|---|
| *B01J 12/00* | (2006.01) |
| *C01B 17/74* | (2006.01) |
| *C01B 17/76* | (2006.01) |
| *C01B 17/80* | (2006.01) |

(52) U.S. Cl.
CPC .............. *C01B 17/74* (2013.01); *C01B 17/76* (2013.01); *C01B 17/803* (2013.01); *B01J 12/00* (2013.01); *B01J 12/005* (2013.01); *B01J 12/007* (2013.01)
USPC ............ 423/532; 422/129; 422/160; 422/211

(58) Field of Classification Search
CPC ...... C01B 17/74; C01B 17/76; C01B 17/803; B01J 12/00; B01J 12/005; B01J 12/007
USPC .................................. 423/532, 129, 160, 211
See application file for complete search history.

(56) References Cited

U.S. PATENT DOCUMENTS

| | | | | |
|---|---|---|---|---|
| 2,071,598 | A | * | 2/1937 | Von Girsewald et al. ...... 423/522 |
| 2,890,929 | A | * | 6/1959 | Rummert ....................... 423/487 |
| 3,436,192 | A | * | 4/1969 | Karlsson ....................... 422/169 |

(Continued)

FOREIGN PATENT DOCUMENTS

| | | |
|---|---|---|
| CH | 361956 A | 5/1962 |
| EP | 0178571 A2 | 4/1986 |
| WO | WO-0304774 A1 | 1/2003 |
| WO | WO-2012084609 A1 | 6/2012 |

OTHER PUBLICATIONS

International Search Report for PCT/EP2013/064193, mailing date Aug. 9, 2013.

*Primary Examiner* — Timothy Vanoy
(74) *Attorney, Agent, or Firm* — Drinker Biddle & Reath LLP

(57) ABSTRACT

The invention relates to a reactor for carrying out an exothermic reaction in the gas phase, which comprises a vessel having an outer wall (13) composed of a metallic material, wherein an inner shell (17) is accommodated in the interior of the reactor (1) and the inner shell (17) has a spacing of at least 50 mm to the inside of the outer wall (13).

10 Claims, 2 Drawing Sheets

(56) References Cited

U.S. PATENT DOCUMENTS

Figure 1:
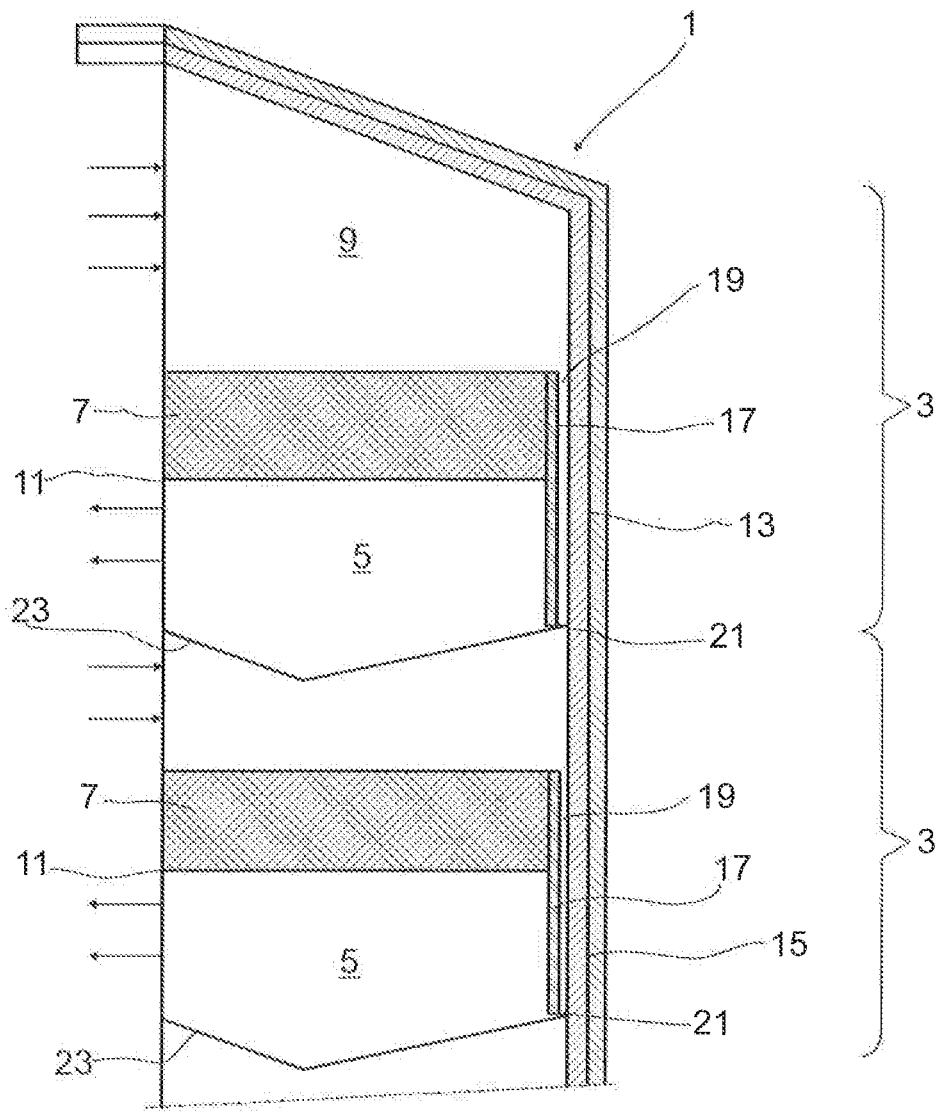

| | | |
|---|---|---|
| 3,515,520 A | 6/1970 | Hervert |
| 4,337,224 A * | 6/1982 | Mahler et al. ............... 422/652 |
| 4,651,894 A | 3/1987 | Ebert |
| 6,652,660 B2 * | 11/2003 | Frost ............................ 134/2 |
| 7,871,593 B2 * | 1/2011 | Erkes et al. ................. 423/532 |
| 2004/0101448 A1 | 5/2004 | Yuichi et al. |

* cited by examiner

REACTOR FOR CARRYING OUT AN EXOTHERMIC REACTION IN THE GAS PHASE

CROSS-REFERENCE TO RELATED APPLICATIONS

This application claims benefit (under 35 USC 119(e)) of U.S. Provisional Application No. 61/668,043, filed Jul. 5, 2012, which is incorporated by reference.

The invention proceeds from a reactor for carrying out an exothermic reaction in the gas phase, which comprises a vessel having an outer wall composed of a metallic material.

Reactors of this type are used, for example, in the case of reactions which are carried out at elevated temperatures. Here, the material of which the reactor is made has to be selected so that it is stable at the temperatures which prevail in the interior of the reactor. Particularly in the case of corrosive media, there is the additional problem that the material is attacked by the media used and additional weakening occurs as a result of the high temperatures at which the reaction is carried out. In particular, it has to be taken into account that the outer wall of the reactor is generally a load-bearing part on which the mass of the reactor additionally rests.

A reaction which is carried out at elevated temperature using corrosive media is, for example, the oxidation of sulfur dioxide to sulfur trioxide.

The reactors used at present for this oxidation are usually made of stainless steel. However, it has been found that the material is damaged due to the temperatures occurring during the oxidation, which leads to a reduction in the creep strength and thus also to a reduced life of the reactor. Thus, for example, the stainless steels having the material numbers 1.4878 or 1.4541 which are generally used are subject to creep damage at temperatures above 560° C. The damage results from a change in the mechanical materials properties which, depending on the progress of the damage, can lead to failure.

It is therefore an object of the present invention to provide a reactor which, compared to the reactors known from the prior art, has an increased operating life when carrying out an exothermic reaction in the gas phase or permits higher gas-phase temperatures.

This object is achieved by a reactor for carrying out an exothermic reaction in the gas phase, which comprises a vessel having an outer wall composed of a metallic material, wherein an inner shell is accommodated in the interior of the reactor and the inner shell has a spacing of at least 50 mm to the inside of the outer wall.

The use of the inner shell results in an additional gas layer being formed between the inner shell and the outer wall of the reactor. The gas layer has an insulating effect, so that the temperatures which act on the outer wall are lower than the temperatures in the interior of the reactor. This prevents the outer wall from being subjected to temperatures which have an adverse effect on the stability of the outer wall, so that the operating life of the reactor is increased. In particular, the use of the inner shell prevents the material of the outer wall becoming brittle because of the temperatures within the reactor and the stability and strength of the outer wall decreasing as a result. Embrittlement of the inner shell has a far less dramatic effect since the inner shell does not have a load-bearing function. Unlike embrittlement of the outer wall, embrittlement of the inner shell does not lead to possible failure of the reactor.

The reactor of the invention is particularly suitable for carrying out exothermic reactions in the gas phase which are carried out at elevated temperatures, for example at temperatures above 300° C., preferably at temperatures above 500° C. In particular, the reactor is suitable for carrying out reactions which contain media which are aggressive toward the material of the outer wall, for example for the reaction of sulfur dioxide with oxygen to form $SO_3$. The $SO_3$ produced in this way is used, for example, in the preparation of sulfuric acid.

In one embodiment, the inner shell is made of the same material as the outer wall. A suitable material for manufacturing outer wall and inner shell is, for example, stainless steel. Here, the stainless steel is selected so that it is stable toward the media comprised in the reactor. When the reactor is used for preparing sulfur trioxide by oxidation of sulfur dioxide, stainless steels having the material numbers 1.4878 or 1.4541, for example are suitable. These are stable toward the sulfur dioxide and sulfur trioxide comprised in the reactor and also have a sufficient long-term stability when the temperature to which the stainless steel is exposed can be kept to below 560° C. Since the inner shell does not have a load-bearing function, unlike the outer wall, embrittlement and an associated decrease in the strength of the material does not lead to failure of the reactor, and under customary operating conditions also not to damage to the inner shell.

A further advantage of the inner shell is that in the case of damage, replacement of the inner shell can be carried out without the entire reactor having to be replaced.

As an alternative to producing outer wall and inner shell from the same material, it is also possible to use different materials for producing outer wall and inner shell. For example, it is possible to use different steels. It is also possible to make the outer wall of a steel and the inner shell of a heat-resistive material which is inert toward the materials comprised in the reactor. As material for the inner shell, it is also possible to use, for example, nonmetals, for example a ceramic or glass. It is also possible to coat the inner shell in order to reduce heat radiation. A suitable coating material for the inner shell is, for example, high-temperature-resistant mineral wools.

It is also possible to make the outer wall of a material other than stainless steel. Here too, it is necessary to use a material which is stable toward the materials comprised in the reactor. Owing to the inner shell and the gas phase between the inner shell and outer wall, the temperature to which the outer wall is exposed is less than the temperature in the interior of the reactor. It is therefore also possible to use a material which is less thermally stable than stainless steel for the outer wall. However, the use of stainless steel as material for the outer wall is preferred. Furthermore, particular preference is given to making the outer wall and inner shell of the same material.

In a further preferred embodiment, there is a gap between the inner shell and the bottom and/or lid of the reactor. Gas can flow from the reactor through the gap between inner shell and outer wall. This ensures, in particular, that the same pressure prevails in the gap between inner shell and outer wall as in the reactor. As a result, the inner shell is not pressurized on one side, namely the inside, but instead the pressure acts uniformly on the inner shell from all sides.

The gap between the inner shell and bottom and/or lid of the reactor is kept so small that although pressure equalization occurs, only a small gas flow through the gap between the inner shell and outer wall is generated. The less the gas moves in the gap between the inner shell and outer wall, the better the insulating effect of the gas. In the case of uniform gas flow, on the other hand, hot gas is normally conveyed into the gap so that the intended insulating effect by the gas does not occur. In the case of cold, introduced gas, it is possible to cool the inner shell and the outer wall by means of the gas flow.

In one embodiment, the reactor comprises internals. For the purposes of the present invention, the internals are, for example, trays, structured or unstructured packets or beds of packing elements. Suitable trays which can be accommodated in the reactor are, for example sieve trays, bubble cup trays or any other desired trays known to those skilled in the art. Particular preference is given to at least one tray being accommodated as internal in the reactor.

In a further embodiment, at least one catalyst bed is comprised in the reactor. The catalyst bed can be configured, for example, as fixed bed or as fluidized bed. When the catalyst bed is a fluidized bed, at least one tray which serves as gas distributor in the fluidized bed is preferably accommodated in the reactor. Between the granular material for the fluidized bed and the tray above it, which acts as lid, a sufficient spacing is left to allow the fluidized bed material to be sufficiently fluidized by a gas flowing through it. The catalyst bed is preferably a fixed bed. For this purpose, the catalyst forming the fixed bed can, for example, rest on a tray. Unlike the case of a fluidized bed, a fixed bed is independent of the flow direction. Thus, flow through this can also be, for example, from the top downward. When a catalyst bed is comprised in the reactor, the tray on which the catalyst rests is, for example, a grating or a metal support sheet for the catalyst.

In the preparation of $SO_3$ by oxidation of sulfur dioxide, preference is given to a catalyst bed in the form of a fixed bed.

In a particularly preferred embodiment, the reactor is divided into a plurality of segments, with each segment having at least one inlet and at least one outlet and each segment comprising a catalyst bed and a gas space above the catalyst bed. The division of the reactor into a plurality of segments is preferably achieved by means of intermediate trays. In the case of a catalyst bed configured as a fixed bed, the inlet is located, for example, above the catalyst bed in the gas space so that the gas flowing through the catalyst bed can be introduced via the inlet. In a gas space below the catalyst bed, the gas flowing through the catalyst bed is collected and can then be taken off from the gas space below the catalyst best via an outlet.

When a catalyst bed is used, the chemical reaction usually takes place in the catalyst bed. In a particularly preferred embodiment, the reactor of the invention is used for the oxidation of sulfur dioxide to sulfur trioxide. For this purpose, gaseous sulfur dioxide and an oxygen-comprising gas are fed in and the sulfur dioxide reacts with the oxygen to form sulfur trioxide. As oxygen-comprising gas, it is possible to use, for example, oxygen or air. When oxygen is used, an inert gas can be additionally comprised. As an alternative, it is also possible for the air to be additionally enriched in oxygen. However, particular preference is given to the use of air.

In the oxidation of sulfur dioxide to sulfur trioxide, the gases are introduced at a temperature in the range from 400 to 460° C. The reaction occurs in the presence of a catalyst at a gauge pressure of 0.4 bar. Owing to the exothermic nature of the reaction, the gas comprising sulfur trioxide, sulfur dioxide and, when air is used, oxygen and nitrogen which leaves the reactor has a temperature of from 550 to 650° C. Accordingly, temperatures in this range are also generated in the reactor. Above a temperature of 560° C., the use of steels 1.4878 or 1.4541 results in a reduced life due to alteration of the mechanical materials properties with a decrease in the strength. To avoid failure of the reactor, the inner shell is therefore accommodated according to the invention in the reactor. The inner shell results in formation of an insulating layer between inner shell and outer wall of the reactor, so that the temperature acting on the outer wall of the reactor is reduced. Thus, for example, it is possible to bring the temperature of the outer wall to a temperature in the range from 400 to 560° C. by means of the inner shell. In this way, the creep strength is not reduced and the life of the reactor is increased. Since, unlike the outer wall of the reactor, the inner shell has no load-bearing function, embrittlement of the inner shell does not lead to damage to the reactor so as to adversely affect operation.

When the reaction, for example the oxidation of sulfur dioxide to sulfur trioxide, is carried out in the presence of a catalyst and the reactor additionally comprises a fluidized bed, particular preference is given to the material of the fluidized bed being catalytically active. For this purpose, the entire granular material of the fluidized bed can be catalytically active or, as an alternative, the fluidized bed can comprise a heterogeneous catalyst in addition to an inert granular material. The catalyst can, for example, likewise be mixed in granular form into the inert granular material of the fluidized bed. However, particular preference is given to the entire granular material of the fluidized bed being catalytically active.

In the case of a fixed bed, it is possible, for example, to use catalytically active packing or catalytically active packing elements. Particular preference is given to making the packing or packing elements of a support material onto which catalytically active material is applied.

The catalyst suitable for the reaction to be carried out in the reactor is in each case used as catalyst.

When a reaction other than the oxidation of sulfur dioxide to sulfur trioxide is carried out in the reactor, it is also possible for the reactor to be made of a material other than stainless steel. The material from which the outer wall of the reactor is produced is dependent on the reaction. It is usual to employ a material which is inert toward the materials to be reacted in the reactor. Regardless of the material of the outer wall, preference is also given to making the inner shell of the same material as the outer wall. Such an inner shell is preferably used when the temperature which acts on the material of the outer wall is so high that damage to the outer wall can occur. As a result of the inner shell, an insulating layer is formed between inner shell and outer wall, so that the temperature which acts on the outer wall of the reactor can be reduced.

Examples of the invention are depicted in the figures and are explained in more detail in the following description.

Figure 2:
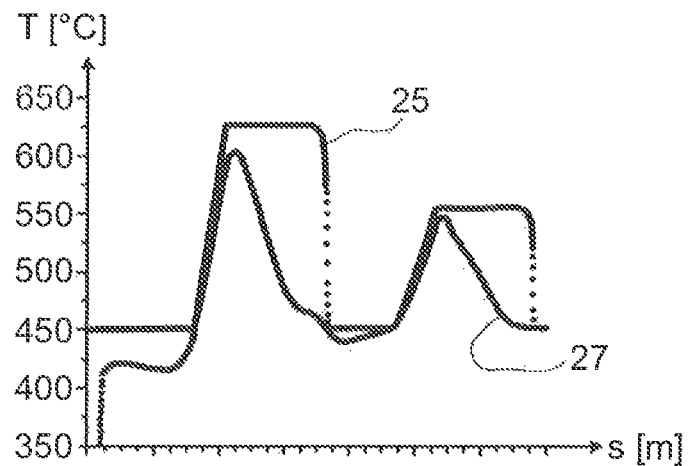
Figure 3:
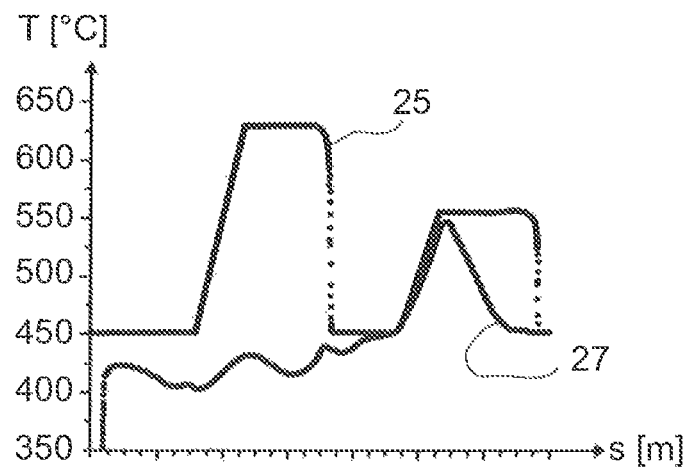

The figures show:

FIG. 1 a section of a reactor constructed according to the invention,

FIG. 2 a temperature distribution without inner shell,

FIG. 3 a temperature distribution with inner shell.

FIG. 1 depicts a section of a reactor.

The section shows a right-hand half of a reactor 1 which is divided into two segments 3. In addition to the two segments 3 shown here, further segments 3 can also be comprised. These are then arranged appropriately above and/or below.

When the reactor is used for the oxidation of sulfur dioxide to sulfur trioxide, each segment 3 usually has a lower gas space 5, a catalyst bed 7 and an upper gas space 9. The catalyst bed 7 is usually configured in the form of a fixed bed and rests on a tray 11. In this case, the tray 11 is, for example, a grating or a metal support sheet for the catalyst.

In operation, a gas stream comprising the starting materials necessary for the reaction is fed into the upper gas space 9. From the upper gas space 9, the gas stream is introduced into the catalyst bed 7. In the catalyst bed 7, the starting materials of the gas stream are converted into the product. The product-comprising gas collects in the lower gas space 5 and can be taken off from the latter. When the reaction of the gas is incomplete, the gas comprising the product in the lower gas space 5 also comprises starting materials.

In the case of an exothermic reaction, heat is liberated during the reaction and, in particular, the catalyst bed 7 is heated up as a result. Since the hot gas exits from the catalyst bed 7, at least the outer wall below the catalyst bed is also heated up.

A reactor usually has a metallic outer wall 13. Owing to the high temperature in the interior of the reactor, the outer wall 13 is provided on its outside with insulation 15.

Owing to the high temperatures in the interior of the reactor which occur due to the exothermic reactions, the outer wall 13 is subjected to a correspondingly high temperature. This can in the case of some materials lead to thermal damage to the material of the outer wall 13. Thus, for example, the steels 1.4878 or 1.4541 usually used for the outer wall 13 in the oxidation of sulfur dioxide to sulfur trioxide are subjected to creep damage at the temperatures occurring in the reaction and this leads to a reduced life of the overall reactor 1. The reduced life results from embrittlement with a decrease in the strength of the outer wall 13.

According to the invention, an inner shell 17 is therefore accommodated in the interior of the reactor 1 and is positioned with a defined spacing to the outer wall 13. Thus, the inner shell 17 forms a gap between inner shell 17 and outer wall 13. The inner shell 17 is, in particular, arranged in the positions at which temperatures above the temperature which could lead to creep damage to the material of the outer wall 13 occur in the reactor.

The gap 19 between outer wall 13 and inner shell 17 is filled with a gas. The gas has an insulating effect and the temperature acting on the outer wall 13 is therefore lower than without use of the inner shell 17. In this way, the temperature which acts on the outer wall 13 can be kept below the critical temperature which leads to creep damage.

The inner shell 17 is in this case preferably made of the same material as the outer wall 13.

The gas comprised in the gap 19 between outer wall 13 and inner shell 17 is preferably the gas fed into the reactor. For this purpose, it is possible, for example, to provide a gap 21 between an intermediate tray 23 by means of which the segments 3 are divided and the inner shell 17. Gas can then exit through the gap 21 from the gap 19 between inner shell 17 and outer wall 13. On the opposite side, the gap 19 is, for example, open to the upper gas space 9. When an additional tray is provided between the upper gas space 9 and the catalyst bed 7, preference is given to the inner shell 17 being provided in the region of the catalyst bed 7 and the lower gas space 5 and an inlet gap being provided between the catalyst bed 7 to the tray separating off the upper gas space 9 through which the gas can enter the gap 19 between inner shell 17 and outer wall 13. However, it is usual not to provide a tray above the catalyst bed 7 so that the gas can flow directly from the upper gas space 9 into the gap 19 between inner shell 17 and outer wall 13.

When cold gas enters the gap, it is not necessary to keep the gas flow very low since the gas itself likewise has a cooling action.

A temperature distribution without inner shell is shown by way of example in FIG. 2.

Here, the temperature of the gas in the interior of the reactor is shown by one line and the temperature at the outer wall is shown by the other. The temperature profile in the interior is denoted by the reference numeral 25 and the temperature profile at the outer wall is denoted by the reference numeral 27.

The position in segment 3 from entry of the gas to exit of the gas is shown in the x axis and the temperature is shown on the y axis.

The gas is fed in with a temperature of 450° C., and flows through the upper gas space 9 until it reaches the catalyst bed 7. In the catalyst bed 7, the chemical reaction commences and, owing to its exothermic nature, leads to a temperature increase. The temperature rises to 630° C. The gas is taken off with a corresponding temperature from the lower gas space 5. The gas is once again introduced into the upper gas space 9 of the second segment at a temperature of 450° C. and the temperature once again increases in the catalyst bed. Owing to the sulfur dioxide which has been reacted in the first segment, the maximum temperature in the second segment is lower than that in the first segment and the temperature rises only to 560° C.

Owing to the high temperature of the gas stream, the metal of the outer wall also heats up. However, as a result of convective heat transfer and heat conduction, the maximum temperature at the outer wall is lower than the temperature in the interior of the gas stream. In addition, the temperature decreases again in the region of the lower gas space 5 until it reaches the upper gas space 9 of a segment located underneath, since the outer wall is cooled in the region of the upper gas space 9 of the subsequent segment. This leads, owing to heat conduction, to a temperature decrease in the lower gas space 5 of the segment 3 further up.

However, the maximum temperature at the outer wall which occurs as a result of the temperature of the gas stream is in the case of a steel outer wall when the reactor is used for the oxidation of sulfur dioxide to sulfur trioxide above the critical temperature above which creep damage to the steel occurs.

FIG. 3 shows, by way of example, the temperature profile in the gas stream and at the outer wall when an inner shell is used.

The temperature profile in the gas stream corresponds to that which also occurs without use of the inner shell. However, the temperature acting on the outer wall 13 is significantly lower as a result of the use of the inner shell 17. Thus, in this example, the temperature maxima in each case in the upper segment are about 525° C. and in the lower segment about 500° C. Thus, the temperatures remain below the critical temperature at which the creep strength of the steel of which the outer wall 13 is made is reduced.

LIST OF REFERENCE NUMERALS

1 Reactor
3 Segment
5 Lower gas space
7 Catalyst bed
9 Upper gas space
11 Tray
13 Outer wall
15 Insulation
17 Inner shell
19 Gap
21 Gap
23 Intermediate tray
25 Temperature profile in the interior
27 Temperature profile at the outer wall

The invention claimed is:
1. A reactor for carrying out an exothermic reaction in the gas phase, which comprises a vessel having an outer wall (13) composed of a metallic material, wherein an inner shell (17) is accommodated in the interior of the reactor (1) and the inner shell (17) has a spacing of at least 50 mm to the inside of the outer wall (13), wherein at least one tray is accommodated in the reactor (1).

2. The reactor according to claim 1, wherein the inner shell (17) is made of the same material as the outer wall (13).

3. The reactor according to claim 1, wherein there is a gap (19) between the inner shell (17) and the bottom and/or lid of the reactor (1).

4. The reactor according to claim 1, wherein a catalyst bed (7) is present in the reactor (1).

5. The reactor according to claim 4, wherein the catalyst bed (7) comprises a heterogeneous catalyst.

6. The reactor according to claim 1, wherein the reactor (1) is divided into a plurality of segments (3), with each segment (3) having at least one inlet and at least one outlet and each segment (3) comprising a catalyst bed (7) and a gas space (9) above the catalyst bed.

7. The reactor according to claim 6, wherein an intermediate tray (23) is accommodated in the reactor (1) to separate in each case two segments (3).

8. The reactor according to claim 6, wherein the catalyst bed (7) comprises a heterogeneous catalyst.

9. The use of the reactor according to claim 1 for carrying out an exothermic reaction in the gas phase, wherein the reaction is carried out at a temperature above 300° C.

10. The use of the reactor according to claim 1 for carrying out a reaction of sulfur dioxide with oxygen to form $SO_3$.

\* \* \* \* \*